United States Patent
Xu

(10) Patent No.: US 9,791,177 B2
(45) Date of Patent: Oct. 17, 2017

(54) CRYOGENIC REFRIGERATOR AND ROTARY JOINT

(71) Applicant: SUMITOMO HEAVY INDUSTRIES, LTD., Tokyo (JP)

(72) Inventor: Mingyao Xu, Nishitokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 45 days.

(21) Appl. No.: 15/044,776

(22) Filed: Feb. 16, 2016

(65) Prior Publication Data
US 2016/0252276 A1 Sep. 1, 2016

(30) Foreign Application Priority Data
Feb. 27, 2015 (JP) .................. 2015-038220

(51) Int. Cl.
*F25B 9/06* (2006.01)
*F25B 1/04* (2006.01)
(Continued)

(52) U.S. Cl.
CPC .................. *F25B 9/06* (2013.01); *F25B 9/14* (2013.01); *H02K 7/1838* (2013.01); *H02K 55/00* (2013.01);
(Continued)

(58) Field of Classification Search
CPC ........ F25B 9/06; F25B 2309/004; F25B 1/04; F25B 1/005; F25B 2309/005; F25B 9/14; F25B 9/145; F25B 2309/1411; F25B 2309/1428; F25B 1/045; F25B 2309/06; F25D 19/006; H02K 7/1838; H02K 55/00; H02K 49/108; H02K 5/128; Y02E 40/62; Y02E 10/725

USPC .......................................... 62/402
IPC .................... F25B 9/06,2309/004, 1/04, 1/005, 2309/005, 9/14, 9/145, 2309/1411, 2309/1428, 1/045, 2309/06; F25D 19/006; H02K 7/1838, 55/00, 49/108, 5/128; Y02E 40/62, 10/725

See application file for complete search history.

(56) References Cited

U.S. PATENT DOCUMENTS 4,291,547 A * 9/1981 Leo ................. F04C 27/009
418/200
5,038,583 A * 8/1991 Gali ................. F04B 27/12
62/402

(Continued)

FOREIGN PATENT DOCUMENTS

JP 2014-156952 A 8/2014

Primary Examiner — Mohammad M Ali
(74) Attorney, Agent, or Firm — Claire Zopf

(57) ABSTRACT

A cryogenic refrigerator includes a compressor for installation on a stationary component, an expander for installation on a rotating component, and a rotary joint fluidly coupling the compressor with the expander. The rotary joint includes: a rotor fixed to the rotating component and coaxial with its rotational axis; a stator disposed adjacent to the rotor to form a clearance between the rotor and the stator, and fixed to the stationary component; a first high-pressure flowpath and a second high-pressure flowpath, extending between the rotor and stator through the clearance, and a working-gas sealing area dividing the clearance into a first high-pressure section communicating with the first high-pressure flowpath, and into a second high-pressure section communicating with the second high-pressure flowpath.

14 Claims, 10 Drawing Sheets

(51) Int. Cl.
    *F25B 9/14*      (2006.01)
    *H02K 55/00*    (2006.01)
    *H02K 7/18*      (2006.01)
    *F25D 19/00*    (2006.01)
(52) U.S. Cl.
    CPC ........... *F25D 19/006* (2013.01); *Y02E 10/725* (2013.01); *Y02E 40/62* (2013.01)

(56) References Cited

U.S. PATENT DOCUMENTS

| | | | | |
|---|---|---|---|---|
| 5,333,460 A | * | 8/1994 | Lewis | F25B 9/14 165/104.33 |
| 2005/0126187 A1 | * | 6/2005 | Li | F25B 9/14 62/6 |
| 2009/0249826 A1 | * | 10/2009 | Hugelman | F04B 27/0808 62/498 |
| 2009/0277213 A1 | * | 11/2009 | Sakitani | F25B 9/06 62/470 |
| 2012/0285181 A1 | * | 11/2012 | Dunn | F25B 9/06 62/6 |
| 2014/0230456 A1 | | 8/2014 | Tajima | |

* cited by examiner

CRYOGENIC REFRIGERATOR AND ROTARY JOINT

RELATED APPLICATIONS

Priority is claimed to Japanese Patent Application No. 2015-038220, filed Feb. 27, 2015, the entire content of which is incorporated herein by reference.

BACKGROUND

Technical Field

Certain embodiments of the invention relate to a cryogenic refrigerators, and particularly, to cryogenic refrigerators for chilling rotating objects. In addition, certain embodiments of the invention relate to a rotary joint suited to such cryogenic refrigerators.

Description of Related Art

Cryogenic cooling devices that realize cryogenic temperatures in continuously rotating systems are known. The cooling devices include a cryogenic refrigerator and a compressor that circulates helium gas to the cryogenic refrigerator. The helium gas circulates through the refrigerator and the compressor via a rotary coupler for helium gas.

SUMMARY

One embodiment of the present invention affords a cryogenic refrigerator for installation on an apparatus, which includes a stationary portion and a rotating portion supported by the stationary portion and axially rotatable, the refrigerator including: a compressor, installed on the stationary portion; an expander installed on the rotating portion; and a rotary joint fluidly coupling the compressor with the expander. The rotary joint includes: a rotor fixed to the rotating portion and coaxial with the rotational axis of the rotating portion; a stator disposed adjacent to the rotor to form a clearance between the rotor and the stator, and which is fixed to the stationary portion; a first high-pressure flowpath, being a flowpath for a first high-pressure working gas having a first high pressure that is higher than ambient pressure of the cryogenic refrigerator and extending from the stator to the rotor through the clearance; a second high-pressure flowpath, being a flowpath for a second high-pressure working gas having a second high pressure that is higher than ambient pressure and is lower than the first high pressure, and extending from the rotor through the clearance to the stator; and a working gas sealing area dividing the clearance into a first high-pressure section communicating with the first high-pressure flowpath, a second high-pressure section adjacent to the first high-pressure section and communicating with the second high-pressure flowpath, and a pressurization section adjacent to the first high-pressure section along an end thereof opposite from its second high-pressure section end. The pressurization section has an intermediate pressure that is higher than ambient pressure and that is lower than the first high pressure.

Another embodiment of the present invention affords a rotary joint for fluidly coupling a cryogenic-refrigerator compressor and expander, the compressor being installed on a stationary component and the expander being installed on a rotating component axially rotatably supported by the stationary component. The joint includes: a rotor fixed to the rotator and coaxial with the rotator's rotational axis; a stator disposed adjacent to the rotor to form a clearance between the rotor and the stator, and fixed to the stationary component; a flowpath for working gas having a pressure higher than ambient pressure of the cryogenic refrigerator, the working gas flowpath extending from the stator through the clearance to the rotor; and a working-gas sealing area dividing the clearance into a high-pressure section communicating with the working gas flowpath, a first pressurization section adjacent to the high-pressure section, and a second pressurization section adjacent to the high-pressure section along an end thereof opposite its first pressurization section end. The first pressurization section has a first intermediate pressure that is higher than ambient pressure and is lower than the high pressure section, and the second pressurization section has a second intermediate pressure that is higher than ambient pressure and is lower than the high pressure section.

Still another embodiment of the present invention affords a cryogenic refrigerator for installation on an apparatus including a stationary portion and a rotating portion axially rotatably supported by the stationary portion. The refrigerator comprises: a compressor installed on the stationary portion; an expander installed on the rotating portion; and a rotary joint fluidly coupling the compressor with the expander. The rotary joint includes: a rotor fixed to the rotating portion and coaxial with the rotating portion's rotational axis; a stator disposed adjacent to the rotor to form a clearance between the rotor and the stator, and fixed to the stationary portion; a first high-pressure flowpath being a flowpath for a first high-pressure working gas having a first high pressure that is higher than ambient pressure of the cryogenic refrigerator, and extending from the stator through the clearance to the rotor; a second high-pressure flowpath, being a flowpath for a second high-pressure working gas having a second high pressure that is higher than ambient pressure and is lower than the first high pressure, and extending from the rotor through the clearance to the stator; and a working-gas sealing area dividing the clearance into a first high-pressure section communicating with the first high-pressure flowpath, and a second high-pressure section communicating with the second high-pressure flowpath. The rotor includes a radially extending annular flat surface surrounding the rotational axis and being perpendicular to the rotational axis. The working-gas sealing area includes a seal sleeve disposed about the rotational axis to seal the second high pressure section from ambient pressure, and the seal disk has a sealing surface contacting the annular flat surface.

Yet another embodiment of the present invention affords a cryogenic refrigerator for installation on an apparatus including a stationary portion and a rotating portion axially rotatably supported by the stationary portion. The refrigerator comprises: a compressor installed on the stationary portion; an expander installed on the rotating portion; and a rotary joint fluidly coupling the compressor with the expander. The rotary joint includes: a rotor fixed to the rotating portion and coaxial with the rotating portion's rotational axis; a stator disposed adjacent to the rotor to form a clearance between the rotor and the stator, and fixed to the stationary portion; a first high-pressure flowpath, being a flowpath for a first high-pressure working gas having a first high pressure that is higher than ambient pressure of the cryogenic refrigerator, and extending from the stator through the clearance to the rotor; a second high-pressure flowpath, being a flowpath for a second high-pressure working gas having a second high pressure that is higher than ambient pressure and is lower than the first high pressure, and extending from the rotor through the clearance to the stator; and a working-gas sealing area dividing the clearance into a first high-pressure section communicating with the first high pressure flowpath, and a second high-pressure section communicating with the second high-pressure flowpath. The working-gas sealing area has a first diameter in the first high-pressure section, and a second diameter in the second high-pressure section, and the first diameter is smaller than the second diameter.

A still further embodiment of the present invention affords a cryogenic refrigerator for installation on an apparatus including a stationary portion and a rotating portion axially rotatably supported by the stationary portion. The refrigerator comprises: a compressor installed on the stationary portion; an expander installed on the rotating portion; and a rotary joint fluidly coupling the compressor with the expander. The rotary joint includes: a rotor fixed to the rotating portion and coaxial with the rotating portion's rotational axis; a stator disposed adjacent to the rotor to form a clearance between the rotor and the stator, and fixed to the stationary portion; a first high-pressure flowpath, being a flowpath for a first high-pressure working gas having a first high pressure that is higher than ambient pressure of the cryogenic refrigerator, and extending from the stator through the clearance to the rotor; a second high-pressure flowpath, being a flowpath for a second high-pressure working gas having a second high pressure that is higher than ambient pressure and is lower than the first high pressure, and extending from the rotor through the clearance to the stator; and a working-gas sealing area dividing the clearance into a first high-pressure section communicating with the first high pressure flowpath, and a second high-pressure section communicating with the second high-pressure flowpath. The rotor includes a rotor base portion fixed to the rotating portion, and a rotor axial end located on the rotor's axially opposite side from the rotor base portion, and where between the stator and the rotor axial end the first high-pressure section is formed. The stator includes a stator bottom wall portion forming a semi-enclosed section surrounding the rotor axial end.

DETAILED DESCRIPTION

Figure 1:
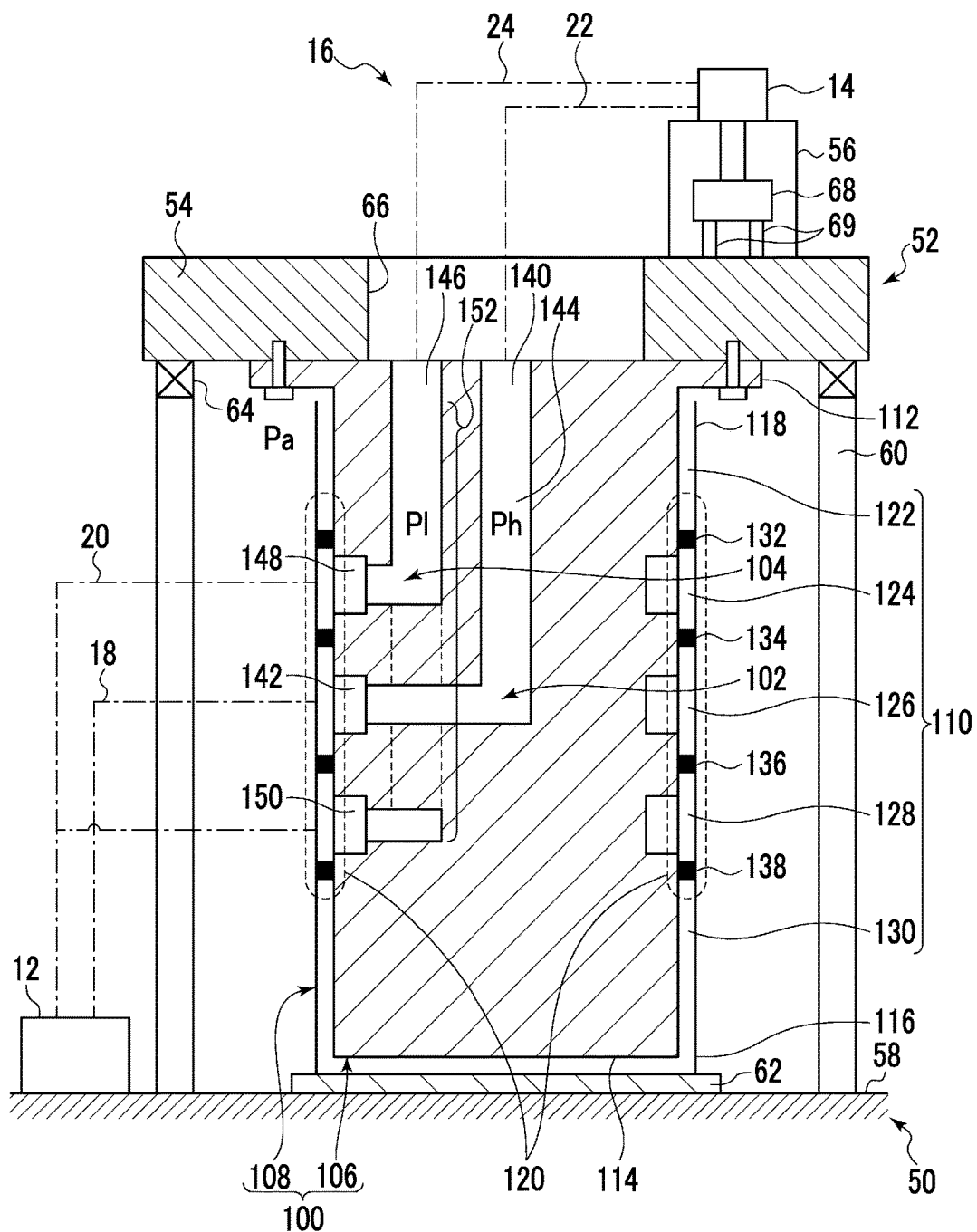
FIG. 1 is a view schematically showing a cryogenic refrigerator according to an embodiment of the present invention.

O-rings for sealing helium gas are provided in a rotary joint. One O-ring seals helium gas, which flows into a refrigerator, from atmospheric pressure. In addition, one other O-ring seals the helium gas, which is re-circulated to a compressor, from atmospheric pressure. In general, since the helium gas used in the refrigerator has a pressure that is significantly higher than atmospheric pressure, it is difficult to completely prevent the helium gas from leaking to an atmospheric environment with only one O-ring.

It is desirable to improve seal efficiency of a working gas in a cryogenic refrigerator that cools a rotating object.

According to certain embodiments of the present invention, it is possible to improve seal efficiency of a working gas in a cryogenic refrigerator that cools a rotating object.

Hereinafter, embodiments of the present invention will be described in detail with reference to the drawings.

In addition, in descriptions, the same reference numerals are assigned to the same elements, and overlapping descriptions thereof are appropriately omitted. In addition, the configurations described below are only examples, and do not limit the scope of the present invention.

First Embodiment

FIG. 1 is a view schematically showing a cryogenic refrigerator 10 according to a first embodiment of the present invention. The cryogenic refrigerator 10 includes a compressor 12, which compresses a working gas (for example, helium gas), and an expander 14, which cools the working gas by adiabatic expansion. The cryogenic refrigerator 10 is an arbitrary regenerative type refrigerator such as a Gifford-McMahon (GM) refrigerator.

The cryogenic refrigerator 10 is installed on an apparatus that includes a stationary portion 50 and a rotating portion 52. The rotating portion 52 is supported by the stationary portion 50 so as to be axially rotatable. That is, the rotating portion 52 is supported by the stationary portion 50 so as to be rotatable around a predetermined rotational axis. The direction of the rotational axis is up-down in FIG. 1. The cryogenic refrigerator 10 cools a rotating object 68 provided on the rotating portion 52. For example, the object 68 is a superconducting device (for example, a superconducting coil). Accordingly, the expander 14 is installed on the rotating portion 52. The compressor 12 is installed on the stationary portion 50.

The rotating portion 52 includes a rotating table 54 and a vacuum vessel 56, and the stationary portion 50 includes a support surface 58, a support 60, and a support frame 62. The rotating table 54 is supported by the support 60 via a bearing 64 so as to be rotatable around the rotational axis of the rotating portion 52. The vacuum vessel 56 is attached to the rotating table 54. The expander 14 is attached to the vacuum vessel 56 so that the low temperature portion of the expander is accommodated in the vacuum vessel 56. The object 68 to be cooled by the cryogenic refrigerator 10 is also accommodated in the vacuum vessel 56. The object 68 is thermally connected to the low temperature portion of the expander 14, and is supported on the rotating table 54 by an object supporting member 69. For example, the object supporting member 69 is formed of a material (for example, glass fiber reinforced plastic (GFRP)) having low thermal conductivity. In addition, the rotating table 54 includes a table opening 66, which has the rotational axis of the rotating portion 52 as the center. Meanwhile, the support 60 is supported by the support surface 58. The support frame 62 is also supported by the support surface 58. The compressor 12 is attached to the support surface 58.

The compressor 12 supplies a first high pressure working gas to the expander 14. The first high pressure working gas has a first high pressure Ph, which is higher than the ambient pressure Pa of the cryogenic refrigerator 10. For example, the ambient pressure Pa of the cryogenic refrigerator 10 is atmospheric pressure or 0.1 MPa. For example, the first high pressure Ph is greater than ten times the pressure (1 MPa) of the ambient pressure Pa or twenty times the pressure (2 MPa) of the ambient pressure Pa.

The first high pressure working gas is reduced in pressure to become the second high pressure working gas by adiabatic expansion in the expander 14. The second high pressure working gas has a second high pressure Pl that is higher than the ambient pressure Pa of the cryogenic refrigerator 10 and that is lower than the first high pressure Ph. For example, the second high pressure Pl is smaller than ten times the pressure (1 MPa) of the ambient pressure Pa or twenty times the pressure (2 MPa) of the ambient pressure Pa. The compressor 12 recovers the second high pressure working gas from the expander 14. The second high pressure working gas is pressurized so as to become the first high pressure working gas again by the compressor 12.

The cryogenic refrigerator 10 includes an working gas line 16 that connects the compressor 12 to the expander 14 so that the first high pressure working gas is discharged from the compressor 12 to the expander 14 and the second high pressure working gas is recirculated from the expander 14 to the compressor 12. The working gas line 16 is a piping system for circulating the working gas between the compressor 12 and the expander 14. The working gas line 16 includes a first stationary portion gas line 18, a second stationary portion gas line 20, a first rotating portion gas line 22, a second rotating portion gas line 24, and a rotary joint 100. The rotary joint 100 is provided so as to perform fluid connection between the compressor 12 and the expander 14, and includes a first high pressure flowpath 102, and a second high pressure flowpath 104.

The first stationary portion gas line 18 and the second stationary portion gas line 20 are disposed in the stationary portion 50. The first stationary portion gas line 18 connects a gas discharging port of the compressor 12 to the first high pressure flowpath 102 of the rotary joint 100. The second stationary portion gas line 20 connects a gas receiving port of the compressor 12 to the second high pressure flowpath 104 of the rotary joint 100.

The first rotating portion gas line 22 and the second rotating portion gas line 24 are disposed in the rotating portion 52. The first rotating portion gas line 22 connects a gas receiving port of the expander 14 to the first high pressure flowpath 102 of the rotary joint 100. The second rotating portion gas line 24 connects a gas discharging port of the expander 14 to the second high pressure flowpath 104 of the rotary joint 100. The first rotating portion gas line 22 and the second rotating portion gas line 24 are respectively connected to the first high pressure flowpath 102 and the second high pressure flowpath 104 through the table opening 66.

Accordingly, the compressor 12 supplies the first high pressure working gas to the expander 14 through the first stationary portion gas line 18, the first high pressure flowpath 102, and the first rotating portion gas line 22. In addition, the compressor 12 recovers the second high pressure working gas from the expander 14 through the second rotating portion gas line 24, the second high pressure flowpath 104, and the second stationary portion gas line 20.

The rotary joint 100 includes a rotor 106 and a stator 108. The rotor 106 is a shaft member that is disposed so as to be coaxial with the rotational axis of the rotating portion 52. The rotor 106 includes a cylindrical outer circumferential surface, which has the rotational axis of the rotating portion 52 as the center axis. The stator 108 is a non-rotating member that is fixed to the stationary portion 50. The stator 108 is a hollow member that is disposed so as to be coaxial with the rotational axis of the rotating portion 52 and surrounds the rotor 106. The stator 108 includes a cylindrical inner circumferential surface, which has the rotational axis of the rotating portion 52 as the center.

A clearance 110 is formed between the rotor 106 and the stator 108. The stator 108 is disposed to be adjacent to the rotor 106 so as to form the clearance 110. The clearance 110 is a slight gap in a radial direction for allowing a rotational movement of the rotor 106 with respect to the stator 108, and an inner diameter of the stator 108 is slightly larger than an outer diameter of the rotor 106.

The rotor 106 includes a rotor base portion 112 that is fixed to the rotating portion 52. The rotor 106 extends from the rotor base portion 112 along the rotational axis of the rotating portion 52 and terminates at a rotor axial end 114. The rotor axial end 114 is positioned in the vicinity of the support frame 62 with a narrow gap in the axial direction between the rotor axial end 114 and the support frame 62. The stator 108 includes a stator base portion 116 that is fixed to the support frame 62 and surrounds the rotor axial end 114. The stator 108 extends from the stator base portion 116 along the rotational axis of the rotating portion 52 and terminates at a stator end 118. The stator end 118 is positioned in the vicinity of the rotor base portion 112 with a narrow gap in the axial direction between the rotor base portion 112 and the stator end 118. In this way, the clearance 110 is formed between the rotor base portion 112 and the stator end 118, and between the rotor axial end 114 and the stator base portion 116.

In the present specification, for easy explanation, a side close to the rotor base portion 112 and the stator end 118 in the axial direction may be referred to as an "upper side", and a side close to the rotor axial end 114 and the stator base portion 116 in the axial direction may be referred to as a "lower side". The definitions do not limit the disposition of the cryogenic refrigerator 10. The rotational axis of the rotating portion 52 may be positioned in an arbitrary direction. For example, the rotational axis may be parallel with a horizontal surface, and the rotor 106 may extend right and left in actual disposition of the cryogenic refrigerator 10.

The rotary joint 100 includes a working-gas sealing area 120, which divides the clearance 110 into at least three sections in an axial direction. The working-gas sealing area 120 divides the clearance 110 into an upper second high pressure section 124, a first high pressure section 126, and a lower second high pressure section 128. The first high pressure section 126 is positioned at the center in the axial direction, and two second high pressure sections are adjacent to both sides of the first high pressure section 126. The first high pressure section 126 communicates with the first high pressure flowpath 102. The upper second high pressure section 124 and the lower second high pressure section 128 communicate with the second high pressure flowpath 104.

In addition, an upper ambient pressure section 122 and a lower ambient pressure section 130 are respectively provided on the outsides in the axial direction of the upper second high pressure section 124 and the lower second high pressure section 128. Accordingly, the operation gas seal portion 120 divides the clearance 110 into five sections, that is, the upper ambient pressure section 122, the upper second high pressure section 124, the first high pressure section 126, the lower second high pressure section 128, and the lower ambient pressure section 130.

In order to perform the section division, the working-gas sealing area 120 includes four seals that are disposed so as to be separated in the axial direction. Each seal is a ring-shaped or annular seal member, which extends between the outer circumferential surface of the rotor 106 and the inner circumferential surface of the stator 108 around the rotational axis, for example, a seal ring such as an O-ring. As the four seals, a first seal 132, a second seal 134, a third seal 136, and a fourth seal 138 are disposed from the upper side to the lower side in the drawings.

The first seal 132 defines a first boundary between the upper ambient pressure section 122 and the upper second high pressure section 124. The second seal 134 defines a second boundary between the upper second high pressure section 124 and the first high pressure section 126. The third seal 136 defines a third boundary between the first high pressure section 126 and the lower second high pressure section 128. The fourth seal 138 defines a fourth boundary between the lower second high pressure section 128 and the lower ambient pressure section 130. That is, the first seal 132 and the fourth seal 138 are a pair of outer seals that partition off pressurization sections from the surrounding environment. The second seal 134 and the third seal 136 are a pair of inner seals that form the first high pressure section 126 in the midportion of the pressurization sections.

The first high pressure flowpath 102 is a gas flow passage of the rotary joint 100 that extends from the stator 108 to the rotor 106 through the first high pressure section 126 of the clearance 110. The first high pressure flowpath 102 includes a first outlet 140, which is open on the rotor base portion 112, a first inlet 142, which is open to the first high pressure section 126, and a first connection path 144, which connects the first inlet 142 to the first outlet 140. The first inlet 142 is an annular groove that is formed on the outer circumferential surface of the rotor 106 around the rotational axis. The direction of the first connection path 144 changes from the direction perpendicular to the rotational axis to the direction parallel to the rotational axis midway. The first high pressure working gas flows from the first stationary portion gas line 18 to the first rotating portion gas line 22 through the first high pressure section 126, the first inlet 142, the first connection path 144, and the first outlet 140.

The second high pressure flowpath 104 is another gas flow passage that is formed in parallel with the first high pressure flowpath 102 and extends from the rotor 106 to the stator 108 through the upper second high pressure section 124 and the lower second high pressure section 128 of the clearance 110. The second high pressure flowpath 104 includes a second inlet 146, which is open on the rotor base portion 112, a second upper outlet 148, which is open to the upper second high pressure section 124, a second lower outlet 150, which is open to the lower second high pressure section 128, and a second connection path 152, which branches the second inlet 146 into the second upper outlet 148 and the second lower outlet 150. The second upper outlet 148 and the second lower outlet 150 are annular grooves that are respectively formed on the outer circumferential surface of the rotor 106 around the rotational axis. The direction of the second connection path 152 changes from the direction parallel to the rotational axis to the direction perpendicular to the rotational axis midway.

The second high pressure working gas flows from the second rotating portion gas line 24 to the second stationary portion gas line 20 through the second inlet 146, the second connection path 152, the second upper outlet 148, and the upper second high pressure section 124. In addition, the second high pressure working gas flows from the second rotating portion gas line 24 to the second stationary portion gas line 20 through the second inlet 146, the second connection path 152, the second lower outlet 150, and the lower second high pressure section 128. Two flows of the second high pressure working gas that branch in the second connection path 152 are combined in the second stationary portion gas line 20.

According to the first embodiment, the first high pressure section 126 is interposed between the two second high pressure sections. Accordingly, the intermediate pressure sections are positioned on both sides of the first high pressure section 126. Therefore, unlike a case where the first high pressure section 126 is directly adjacent to the ambient pressure Pa, it is possible to decrease leakage of the first high pressure working gas from the first high pressure section 126 to the surrounding environment.

In an embodiment, the working-gas sealing area 120 may divide the clearance 110 into the first high pressure section 126, the upper second high pressure section 124, and a lower pressurization section. Alternatively, the working-gas sealing area 120 may divide the clearance 110 into the first high pressure section 126, an upper pressurization section, and the lower second high pressure section 128. Alternatively, the working-gas sealing area 120 may divide the clearance 110 into the first high pressure section 126, the upper pressurization section, and the lower pressurization section. Here, the upper pressurization section and the lower pressurization section are intermediate pressure regions that are adjacent to the first high pressure section 126 but are independent from the second high pressure flowpath 104. The upper pressurization section and the lower pressurization section respectively have a first intermediate pressure and a second intermediate pressure that are higher than the ambient pressure Pa and are lower than the first high pressure Ph. The first intermediate pressure may be equal to or be different from the second intermediate pressure. At least one of the first intermediate pressure and the second intermediate pressure may be equal to the second high pressure Pl.

In another embodiment, at least one second high pressure section may not be adjacent to the first high pressure section 126 and may be separated from the first high pressure section 126 in the axial direction. In this case, the working-gas sealing area 120 may divide the clearance 110 into the second high pressure section, the upper pressurization section, and the lower pressurization section. Here, the upper pressurization section and the lower pressurization section respectively have a first intermediate pressure and a second intermediate pressure that are higher than the ambient pressure Pa and are lower than the second high pressure Pl.

The second high pressure Pl, the first intermediate pressure, and/or the second intermediate pressure may be selected from a range of 0.11 MPa to 0.2 MPa. Accordingly, when the ambient pressure Pa is atmospheric pressure, a differential pressure between the second high pressure section (and/or the pressurization section) and the ambient pressure section can decrease so as to be 0.1 MPa or less. In this case, magnetic fluid seals can be adopted as the pair of outer seals that divide the pressurization section from the surrounding environment.

In still another embodiment, the working gas line 16 may include a first rotary joint, which connects the first stationary portion gas line 18 to the first rotating portion gas line 22, and a second rotary joint, which connects the second stationary portion gas line 20 to the second rotating portion gas line 24. The first rotary joint may include a first rotor and a first stator, and a first clearance may be formed between the first rotor and the first stator. The first rotary joint may include a first working-gas sealing area, which divides the first clearance into a first high pressure section, an upper pressurization section, and a lower pressurization section. The second rotary joint may include a second rotor and a second stator, and a second clearance may be formed between the second rotor and the second stator. The second rotary joint may include a second working-gas sealing area that divides the second clearance into a second high pressure section, an upper pressurization section, and a lower pressurization section.

Second Embodiment

Figure 2:
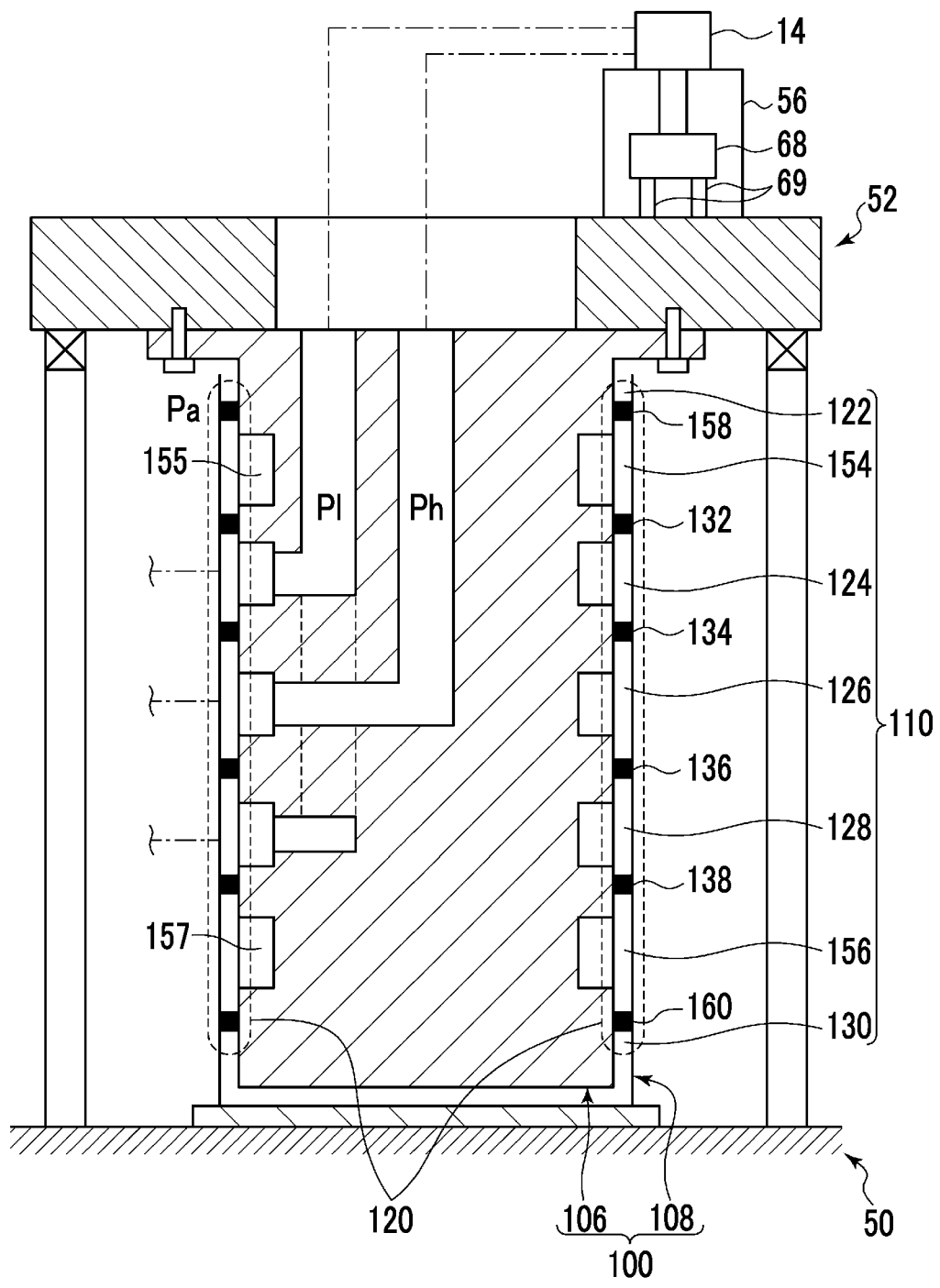
FIG. 2 is a view schematically showing a cryogenic refrigerator according to another embodiment of the present invention.

FIG. 2 is a view schematically showing a cryogenic refrigerator 10 according to a second embodiment of the present invention. The cryogenic refrigerator 10 according to the second embodiment is different from the cryogenic refrigerator 10 according to the first embodiment in that each of two buffer sections is added on each of both sides of two second high pressure sections (or upper pressurization section and lower pressurization section). That is, a buffer section is formed between each of the second high pressure sections and each of the ambient pressure sections.

In the working-gas sealing area 120, a first buffer section 154 and a second buffer section 156 are formed in the clearance 110. The first buffer section 154 is adjacent to the upper second high pressure section 124 on a side opposite to the first high pressure section 126 in the axial direction. The second buffer section 156 is adjacent to the lower second high pressure section 128 on a side opposite to the first high pressure section 126 in the axial direction. In addition, the first buffer section 154 includes a first annular groove 155 that is formed on the outer circumferential surface of the rotor 106 around the rotational axis. The second buffer section 156 includes a second annular groove 157 that is formed on the outer circumferential surface of the rotor 106 around the rotational axis.

The first buffer section 154 and the second buffer section 156 respectively have a first buffering pressure and a second buffering pressure that are higher than the ambient pressure Pa and are lower than the second high pressure Pl. The first buffering pressure and the second buffering pressure may be equal to or be different from each other.

The working-gas sealing area 120 includes a first auxiliary seal 158 and a second auxiliary seal 160 in addition to the first seal 132, the second seal 134, the third seal 136, and the fourth seal 138. The six seals are separated from one another in the axial direction and are disposed in the clearance 110. Similarly to other seals, each of the first auxiliary seal 158 and the second auxiliary seal 160 is a ring-shaped or annular seal member that extends between the outer circumferential surface of the rotor 106 and the inner circumferential surface of the stator 108 around the rotational axis, for example, a seal ring such as an O-ring.

The first auxiliary seal 158 defines a boundary between the upper ambient pressure section 122 and the first buffer section 154. The second auxiliary seal 160 defines a boundary between the second buffer section 156 and the lower ambient pressure section 130. The first auxiliary seal 158 and the second auxiliary seal 160 are a pair of outermost seals that divide the buffer sections from the surrounding environment. The first seal 132 and the fourth seal 138 are positioned between the outermost seals. Accordingly, the first seal 132 defines a boundary between the first buffer section 154 and the upper second high pressure section 124. The fourth seal 138 defines a boundary between the lower second high pressure section 128 and the second buffer section 156.

According to the second embodiment, the first high pressure section 126 is interposed between the two second high pressure sections, and the two second high pressure sections are interposed between the two buffer sections. In this way, there are two intermediate pressure sections between the first high pressure section 126 and the ambient pressure Pa on both sides of the first high pressure section 126. Accordingly, unlike the case where the first high pressure section 126 is directly adjacent to the ambient pressure Pa, it is possible to decrease leakage of the first high pressure working gas from the first high pressure section 126 to the surrounding environment. In addition, unlike the case where the second high pressure section is directly adjacent to the ambient pressure Pa, it is possible to decrease leakage of the second high pressure working gas from the second high pressure section to the surrounding environment.

The first buffering pressure and/or the second buffering pressure may be selected from a range of 0.11 MPa to 0.2 MPa. Accordingly, when the ambient pressure Pa is atmospheric pressure, the differential pressure between the buffer section and the ambient pressure section can decrease so as to be 0.1 MPa or less. In this case, magnetic fluid seals can be adopted as the pair of outermost seals that divide the buffer section from the surrounding environment. In addition, a general operating pressure of the cryogenic refrigerator 10 can be used as the second high pressure Pl. In this case, for example, the second high pressure Pl may be a pressure that is selected from a range that is higher than 0.2 MPa and less than 1 MPa.

Figure 3:
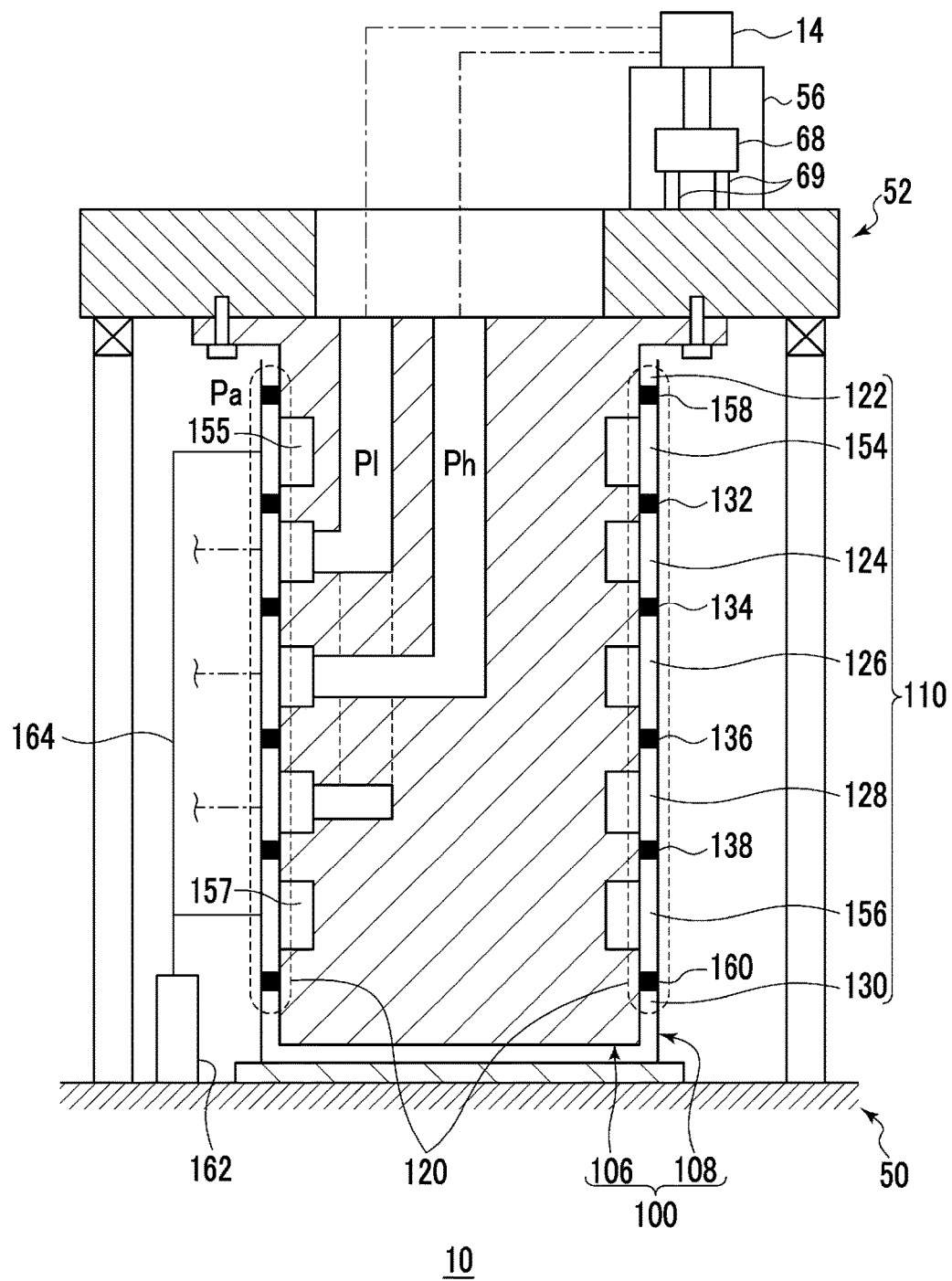
FIG. 3 is a view schematically showing the cryogenic refrigerator according to another embodiment of the present invention.

In another embodiment, as shown in FIG. 3, the rotary joint 100 may include a buffer volume 162 or a pressure control volume. For example, the buffer volume 162 is a buffer tank. The buffer volume 162 is installed on the stationary portion 50, and is connected to the first buffer section 154 and the second buffer section 156 using communication paths 164. The buffer volume 162 has a pressure that is higher than the ambient pressure Pa and that is lower than the second high pressure Pl, for example, a pressure that is selected from a range of 0.11 MPa to 0.2 MPa. Even when gas leaks to the buffer section through the first seal 132 and the fourth seal 138, it is possible to prevent pressure of the first buffer section 154 and the second buffer section 156 from increasing using the buffer volume 162.

In still another embodiment, the buffer volume 162 may be installed on the rotating portion 52, and in this case, the buffer volume 162 may be connected to the first buffer section 154 and the second buffer section 156 through a rotor inner flowpath serving as the communication path 164. In addition, in still another embodiment, the buffer volume 162 may include a first buffer volume that is connected to the first buffer section 154 and a second buffer volume that is connected to the second buffer section 156.

Figure 4:
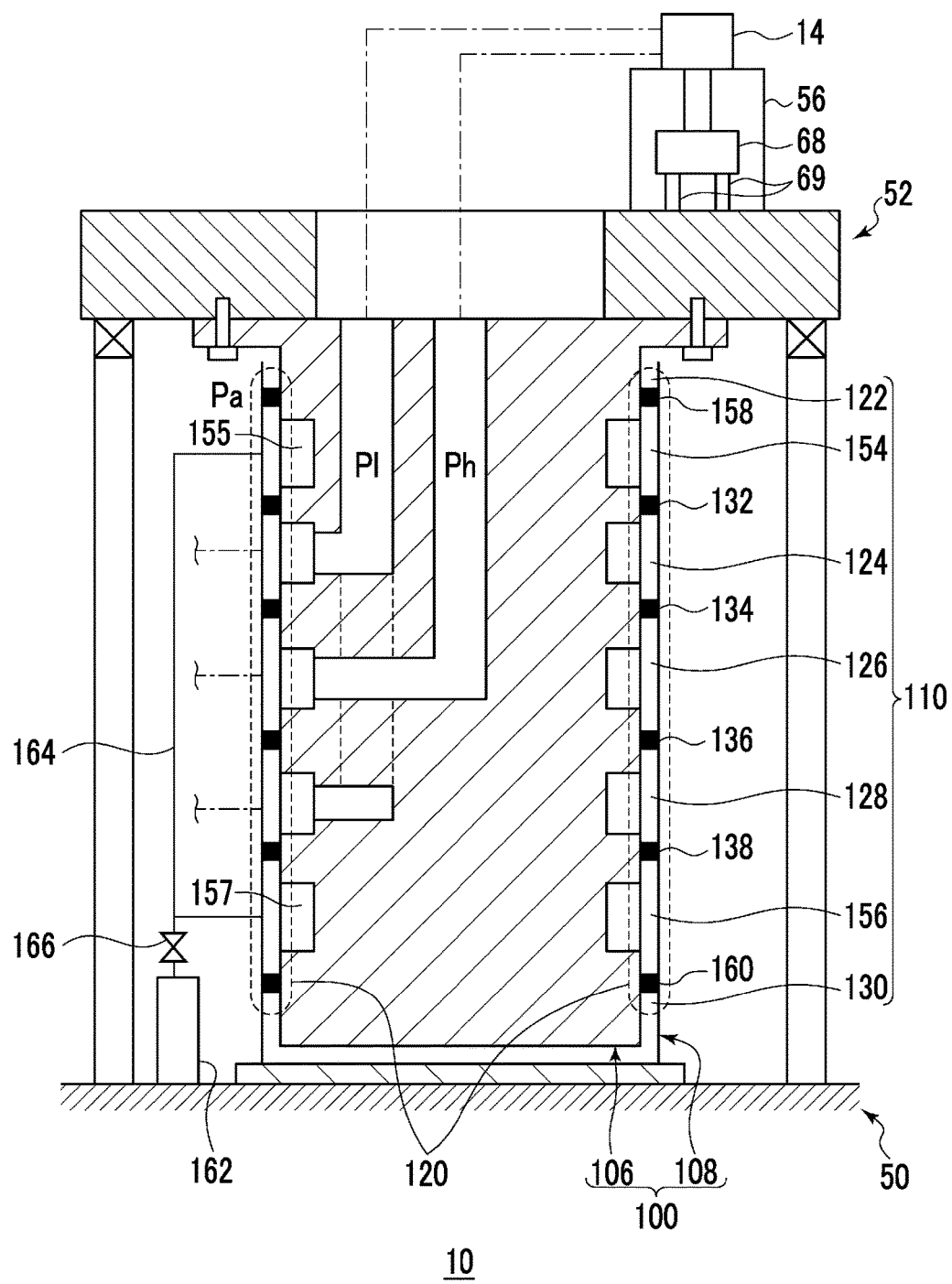
FIG. 4 is a view schematically showing the cryogenic refrigerator according to another embodiment of the present invention.

In still another embodiment, as shown in FIG. 4, the rotary joint 100 may include a pressure control valve 166 in the communication path 164. The buffer volume 162 is connected to the first buffer section 154 and the second buffer section 156 via the pressure control valve 166. The pressure control valve 166 is mechanically opened and closed by a differential pressure between the buffer volume 162 and the buffer section. When the pressure of the buffer section increases and the differential pressure exceeds a predetermined value, the pressure control valve 166 is opened. Accordingly, pressure of the first buffer section 154 and the second buffer section 156 can be released to the buffer volume 162 through the pressure control valve 166. Accordingly, it is possible to prevent the pressure of the first buffer section 154 and the second buffer section 156 from increasing.

In still another embodiment, the rotary joint 100 may include a first pressure control valve and a second pressure control valve. The buffer volume 162 may be connected to the first buffer section 154 via the first pressure control valve, and be connected to the second buffer section 156 via the second pressure control valve.

Figure 5:
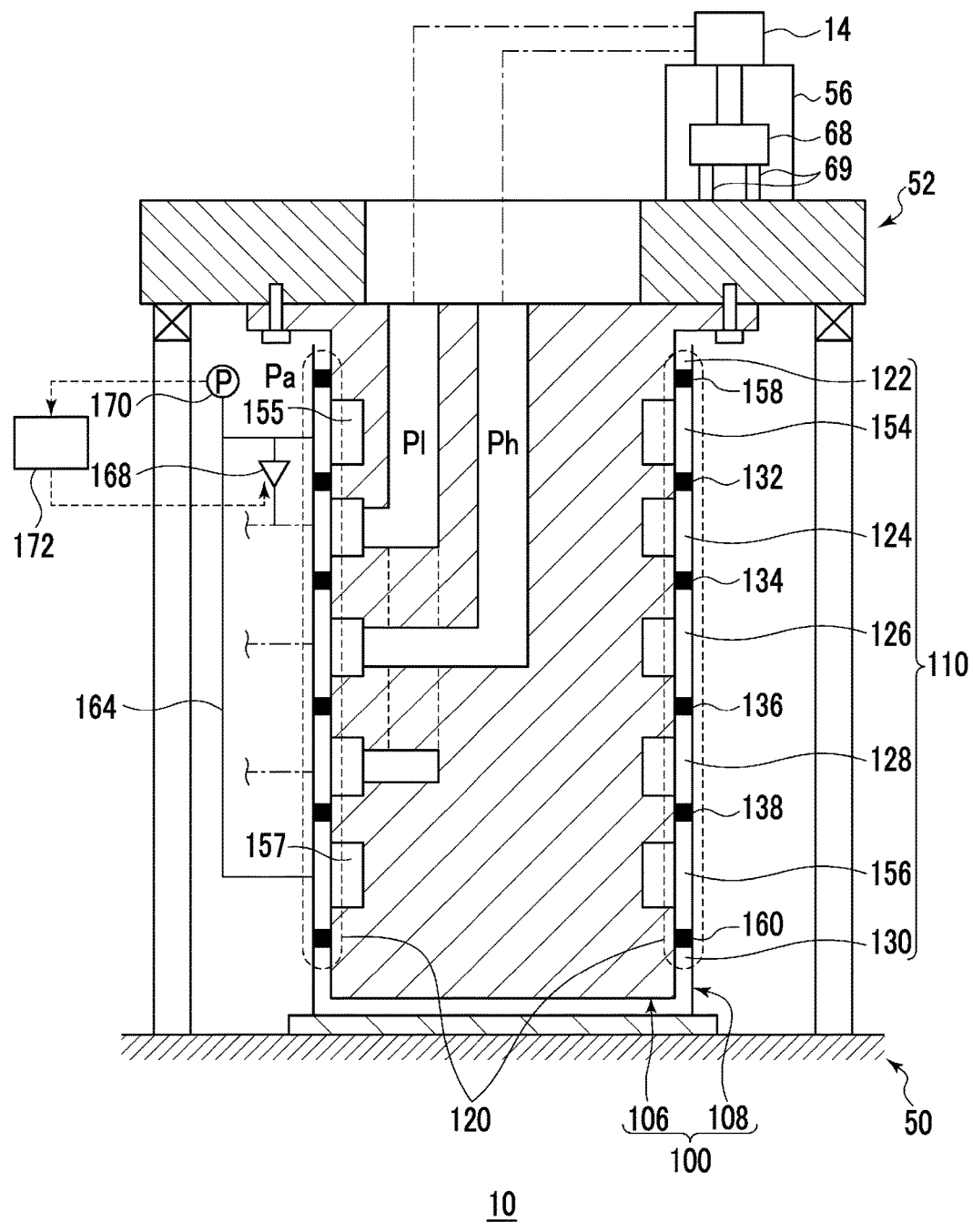
FIG. 5 is a view schematically showing the cryogenic refrigerator according to another embodiment of the present invention.

Instead of the buffer volume 162, in still another embodiment, as shown in FIG. 5, the rotary joint 100 may include an auxiliary compressor 168 in the communication path 164. A pressure sensor 170, which measures pressure of the buffer section, and the communication path 164 may be provided. In addition, a control unit 172, which controls the auxiliary compressor 168 based on the pressure measured by the pressure sensor 170, may be provided. The control unit 172 may be a portion of a controller for controlling the cryogenic refrigerator 10.

The first buffer section 154 and the second buffer section 156 are connected to the upper second high pressure section 124 via the auxiliary compressor 168. The control unit 172 determines whether or not the pressure of the buffer section exceeds a predetermined value, based on the pressure measured by the pressure sensor 170. When the pressure of the buffer section does not exceed the predetermined value, the control unit 172 does not operate the auxiliary compressor 168. Meanwhile, when the pressure of the buffer section exceeds the predetermined value, the control unit 172 operates the auxiliary compressor 168. In this way, the auxiliary compressor 168 recovers and compresses the gas from the first buffer section 154 and the second buffer section 156, and supplies the gas to the upper second high pressure section 124. Accordingly, it is possible to prevent pressure of the first buffer section 154 and the second buffer section 156 from increasing.

In still another embodiment, the first buffer section 154 and the second buffer section 156 may be connected to the first high pressure section 126, the lower second high pressure section 128, or arbitrary other high pressure regions in the cryogenic refrigerator 10 via the auxiliary compressor 168. Moreover, in still another embodiment, the auxiliary compressor 168 may include a first auxiliary compressor and a second auxiliary compressor. The first buffer section 154 may be connected to the upper second high pressure section 124 or arbitrary other high pressure regions via the first auxiliary compressor. The second buffer section 156 may be connected to the lower second high pressure section 128 or arbitrary other high pressure regions via the second auxiliary compressor. In still another embodiment, the rotary joint 100 may include both the buffer volume 162 and the auxiliary compressor 168.

In still another embodiment, in the working-gas sealing area 120, only one of the first buffer section 154 and the second buffer section 156 may be formed in the clearance 110. In still another embodiment, a gas different from the working gas of the cryogenic refrigerator 10, for example, the same gas as the gas of the surrounding environment may be sealed in the first buffer section 154 and/or the second buffer section 156.

Third Embodiment

Figure 6:
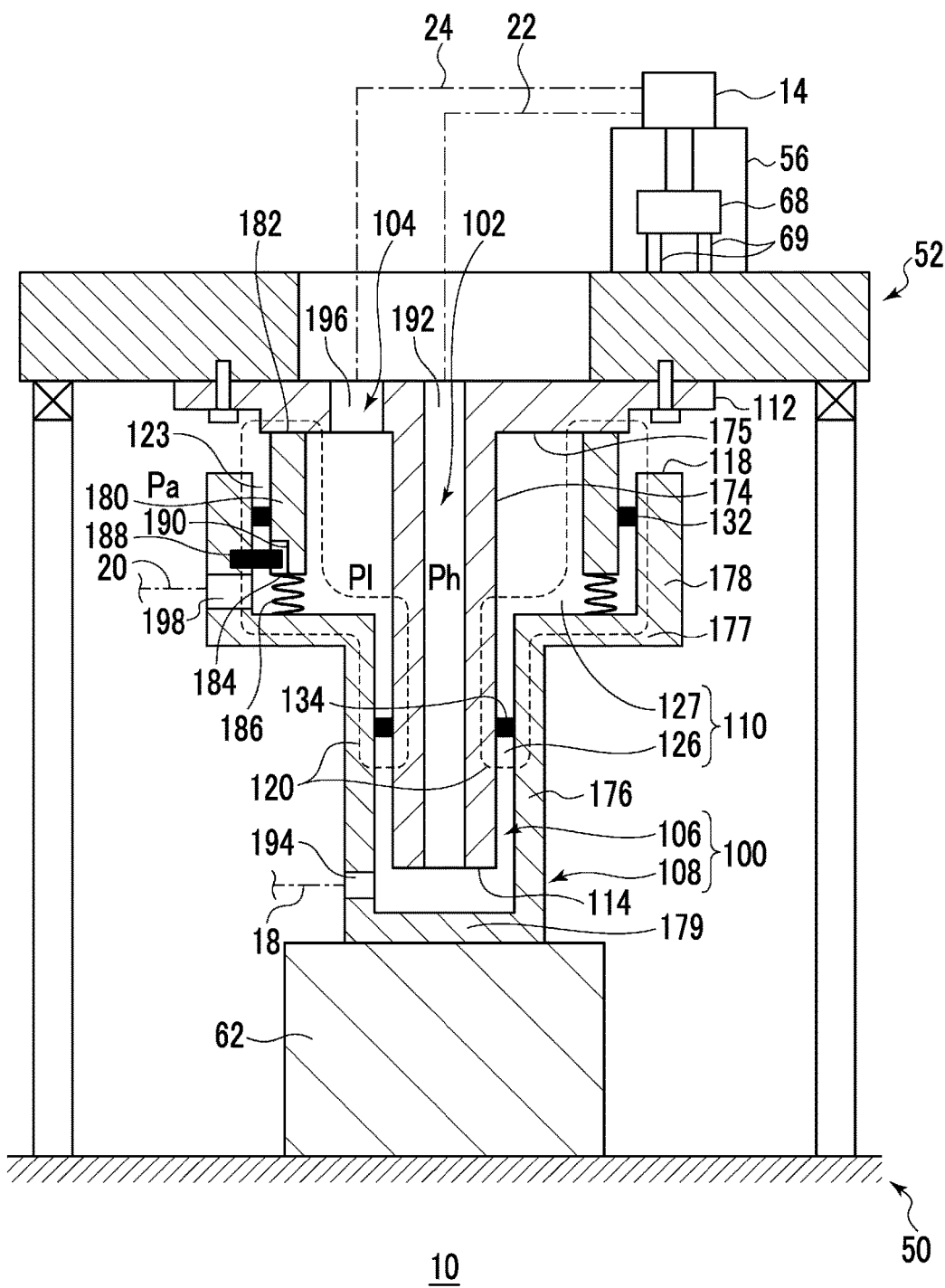
FIG. 6 is a view schematically showing a cryogenic refrigerator according to still another embodiment of the present invention.

FIG. 6 is a view schematically showing a cryogenic refrigerator 10 according to a third embodiment of the present invention. With respect to a low-pressure side seal structure, the cryogenic refrigerator 10 according to the third embodiment is different from the cryogenic refrigerators 10 according to the first and second embodiments.

Similarly to the cryogenic refrigerators 10 according to the first and second embodiments, also in the cryogenic refrigerator 10 according to the third embodiment, the clearance 110 is formed between the rotor 106 and the stator 108. The stator 108 is disposed so as to be adjacent to the rotor 106 to form the clearance 110.

The rotor 106 includes a rotor base portion 112 that is fixed to the rotating portion 52, and a rotor shaft portion 174 that coaxially extends from the rotor base portion 112 along the rotational axis of the rotating portion 52. The rotor base portion 112 includes an annular flat surface 175 that extends in the radial direction around the rotational axis and is perpendicular to the rotational axis. The rotor shaft portion 174 is thinner than the rotor base portion 112. The rotor shaft portion 174 protrudes from the center portion of the annular flat surface 175 and terminates at the rotor axial end 114.

According to the shape of the rotor, the stator 108 includes a stator small diameter portion 176 and a stator large diameter portion 178. The stator 108 includes a stator step portion 177 that connects between the stator small diameter portion 176 and the stator large diameter portion 178 in the radial direction. The stator small diameter portion 176 coaxially surrounds the rotor axial end 114, and the stator large diameter portion 178 coaxially surrounds the rotor shaft portion 174.

In addition, the stator 108 includes a stator bottom wall portion 179 that is fixed to the support frame 62. The stator bottom wall portion 179 closes the lower end of the stator small diameter portion 176, and forms a semi-enclosed section that surrounds the rotor axial end 114. Instead of inserting a seal between two members adjacent to each other, in the stator 108, airtightness is structurally held on the lower end of the stator 108.

The stator small diameter portion 176 extends from the stator bottom wall portion 179 to the stator step portion 177 along the rotational axis of the rotating portion 52. The stator large diameter portion 178 extends from the stator step portion 177 to the stator end 118 along the rotational axis of the rotating portion 52.

The working-gas sealing area 120 divides the clearance 110 into the first high pressure section 126 that communicates with the first high pressure flowpath 102, and the second high pressure section 127 that communicates with the second high pressure flowpath 104. The first high pressure section 126 and the second high pressure section 127 are adjacent to each other. The ambient pressure section 123 is adjacent to the second high pressure section 127 on the side opposite to the first high pressure section 126. Accordingly, the working-gas sealing area 120 includes three seals that are disposed so as to be separated from each other in the axial direction, that is, a first seal 132, a second seal 134, and a seal sleeve 180.

The seal sleeve 180 is disposed around the rotational axis of the rotating portion 52 so as to seal the second high pressure section 127 from the ambient pressure Pa. The seal sleeve 180 is surrounded by the stator large diameter portion 178. In addition, the seal sleeve 180 is a tubular member that coaxially surrounds the rotor shaft portion 174. One end surface of the tubular portion is a ring-shaped seal surface 182 that comes into contact with the annular flat surface 175. The other end surface of the tubular portion is a pressure receiving surface 184 facing the second high pressure section 127. The pressure receiving surface 184 receives the second high pressure Pl, and accordingly, the seal sleeve 180 is pressed to the annular flat surface 175.

In addition, the working-gas sealing area 120 includes a pressing member 186 that connects the seal sleeve 180 to the stator 108 and presses the seal sleeve 180 to the annular flat surface 175. For example, the pressing member 186 is a push spring. One end of the pressing member 186 is attached to the stator step portion 177, and the other end is attached to the pressure receiving surface 184. The seal sleeve 180 is pressed to the annular flat surface 175 by not only the second high pressure Pl but also the pressing member 186.

Since the seal sleeve 180 is connected to the stator 108, similarly to the stator 108, the seal sleeve 180 is a non-rotating member. However, the seal sleeve 180 is connected to the stator 108 so as to have play in the axial direction. A guide pin 188 is provided in the stator large diameter portion 178, and the seal sleeve 180 includes a guide pin hole 190 that receives the guide pin 188. The guide pin 188 protrudes inward in the radial direction from the inner circumferential surface of the stator large diameter portion 178. The guide pin hole 190 is formed at a position in the outer circumferential surface of the seal sleeve 180 facing the guide pin 188. There is a movement freedom in the axial direction between the guide pin 188 and the guide pin hole 190, and when the seal sleeve 180 is pressed to the annular flat surface 175, the seal sleeve 180 can slightly move in the axial direction.

The seal surface 182 defines a boundary between the ambient pressure section 123 and the second high pressure section 127. The first seal 132 also defines the boundary between the ambient pressure section 123 and the second high pressure section 127. However, the first seal 132 is disposed between the stator 108 and the seal sleeve 180. A gap between the inner circumferential surface of the stator large diameter portion 178 and the outer circumferential surface of the seal sleeve 180 circumferentially extends around the rotational axis due to the first seal 132. The second seal 134 defines a boundary between the second high pressure section 127 and the first high pressure section 126. A gap between the inner circumferential surface of the stator small diameter portion 176 and the outer circumferential surface of the rotor shaft portion 174 circumferentially extends around the rotational axis due to the second seal 134. The first high pressure section 126 is formed between the rotor axial end 114 and the stator bottom wall portion 179.

The first high pressure flowpath 102 includes a first rotor flowpath 192 and the first stator flowpath 194. The first rotor flowpath 192 penetrates the rotor shaft portion 174 in the axial direction from the rotor base portion 112 to the rotor axial end 114. The first stator flowpath 194 penetrates the stator small diameter portion 176 in the radial direction. The first high pressure working gas flows from the first stationary portion gas line 18 to the first rotating portion gas line 22 through the first stator flowpath 194, the first high pressure section 126, and the first rotor flowpath 192.

The second high pressure flowpath 104 includes a second rotor flowpath 196 and a second stator flowpath 198. The second rotor flowpath 196 penetrates the rotor base portion 112 in the axial direction. The second stator flowpath 198 penetrates the stator large diameter portion 178 in the radial direction. The second high pressure working gas flows from the second rotating portion gas line 24 to the second stationary portion gas line 20 through the second rotor flowpath 196, the second high pressure section 127, and the second stator flowpath 198.

According to the third embodiment, the working-gas sealing area 120 forms an axial contact seal between the seal sleeve 180 and the rotor base portion 112. By sufficiently increasing the area of the seal surface 182, it is possible to remarkably decrease leakage of the second high pressure operation gas from the second high pressure section 127 to the surrounding environment. Since the first seal 132 is provided between two non-rotating members, unlike a case where the first seal 132 is provided between the rotating portion 52 and the stationary portion 50, it is possible to easily realize improved seal efficiency.

In addition, since the lower end of the stator 108 is sealed by the stator bottom wall portion 179, it is possible to prevent the first high pressure working gas from leaking from the first high pressure section 126 to the surrounding environment.

The working-gas sealing area 120 has a first diameter in the first high pressure section 126 and a second diameter in the second high pressure section 127, and the first diameter is smaller than the second diameter. Accordingly, the length in the circumferential direction of the second seal 134 is shorter than the length in the circumferential direction of the first seal 132. By using the shorter seal in the higher pressure side, it is possible to decrease leakage of gas from the high pressure side.

Figure 7:
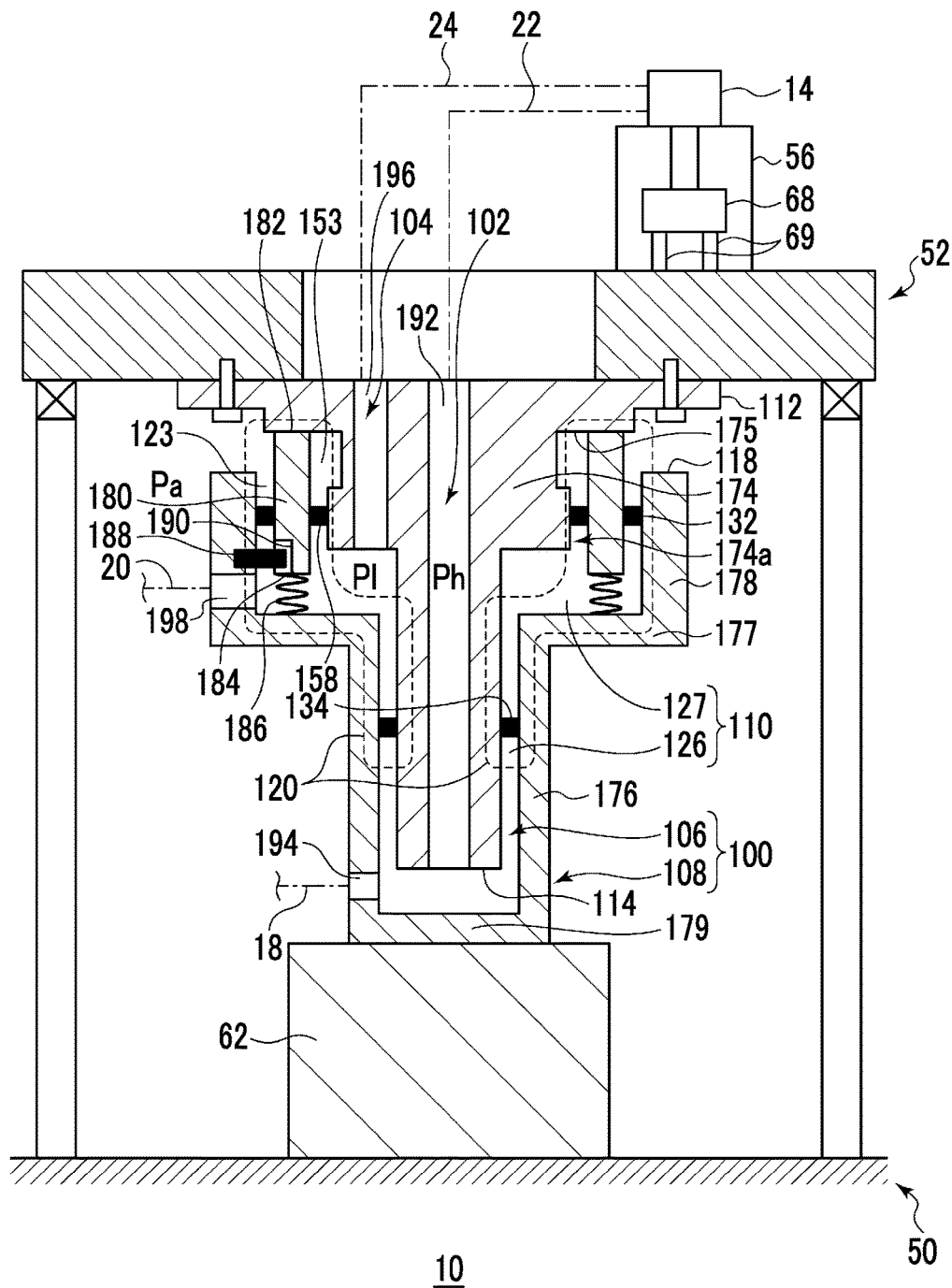
FIG. 7 is a view schematically showing the cryogenic refrigerator according to still another embodiment of the present invention.

In an embodiment, as shown in FIG. 7, the working-gas sealing area 120 may include a first auxiliary seal 158 that is disposed between the seal sleeve 180 and the rotor 106 and that extends around the rotational axis of the rotating portion 52.

The rotor shaft portion 174 may include an enlarged diameter portion 174a for attaching the first auxiliary seal 158. A gap between the inner circumferential surface of the seal sleeve 180 and the outer circumferential surface of the enlarged diameter portion 174a of the rotor shaft portion 174 may extend in the circumferential direction around the rotational axis due to the first auxiliary seal 158. The first auxiliary seal 158 may be disposed on the inner side in the radial direction of the first seal 132 at the same axial position as the first seal 132.

The clearance 110 may include a buffer section 153 that is formed between the first auxiliary seal 158 and the seal surface 182. The buffer section 153 may have a buffering pressure that is higher than the ambient pressure Pa and that is lower than the second high pressure Pl. In this way, it is possible to decrease leakage of the second high pressure working gas from the second high pressure section 127 to the surrounding environment.

Fourth Embodiment

Figure 8:
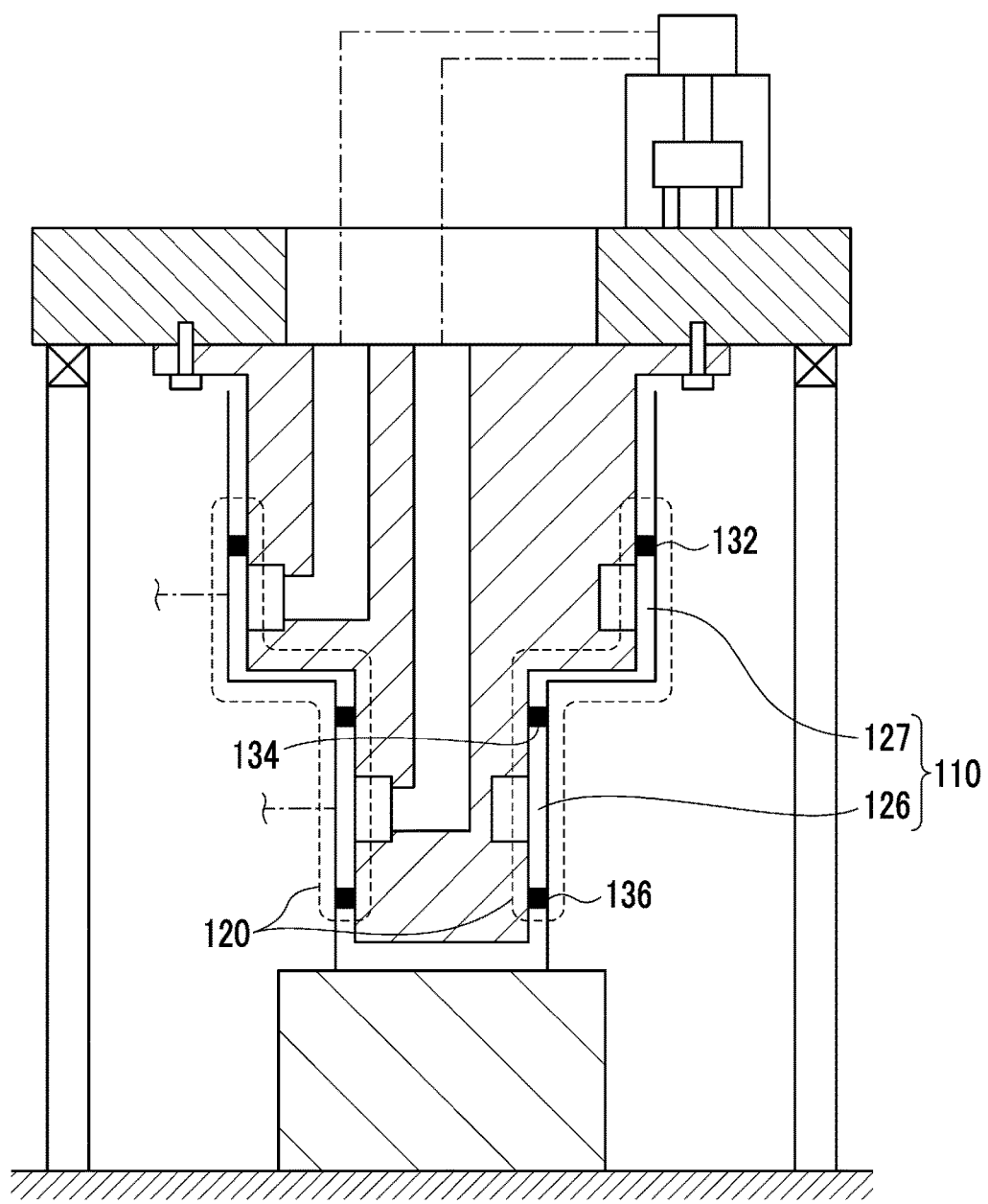
FIG. 8 is a view schematically showing a cryogenic refrigerator according to still another embodiment of the present invention.

FIG. 8 is a view schematically showing a cryogenic refrigerator 10 according to a fourth embodiment of the present invention. Similarly to the cryogenic refrigerator 10 according to the third embodiment, in the cryogenic refrigerator 10 according to the fourth embodiment, the working-gas sealing area 120 includes the first diameter in the first high pressure section 126 and the second diameter in the second high pressure section 127, and the first diameter is smaller than the second diameter.

However, unlike the cryogenic refrigerator 10 according to the third embodiment, the cryogenic refrigerator 10 according to the fourth embodiment does not include the seal sleeve. Similarly to the cryogenic refrigerators 10 according to the first and second embodiments, the cryogenic refrigerator 10 according to the fourth embodiment includes the first seal 132, the second seal 134, and the third seal 136.

Since the diameter of the first high pressure section 126 is smaller than the diameter of the second high pressure section 127, the lengths in the circumferential direction of the second seal 134 and the third seal 136 are shorter than the length in the circumferential direction of the first seal 132. By using the shorter seal in the higher pressure side, it is possible to decrease leakage of gas from the high pressure side. In other words, in the clearance 110, the sectional area of the flowpath on the high pressure side is smaller than the sectional area of the flowpath on the low pressure side. In this way, it is possible to decrease leakage of the first high pressure working gas from the first high pressure section 126 to the surrounding environment.

In an embodiment, the thickness in the axial direction of the third seal 136 may be thicker than the thickness in the axial direction of the first seal 132 and/or the second seal 134.

Fifth Embodiment

Figure 9:
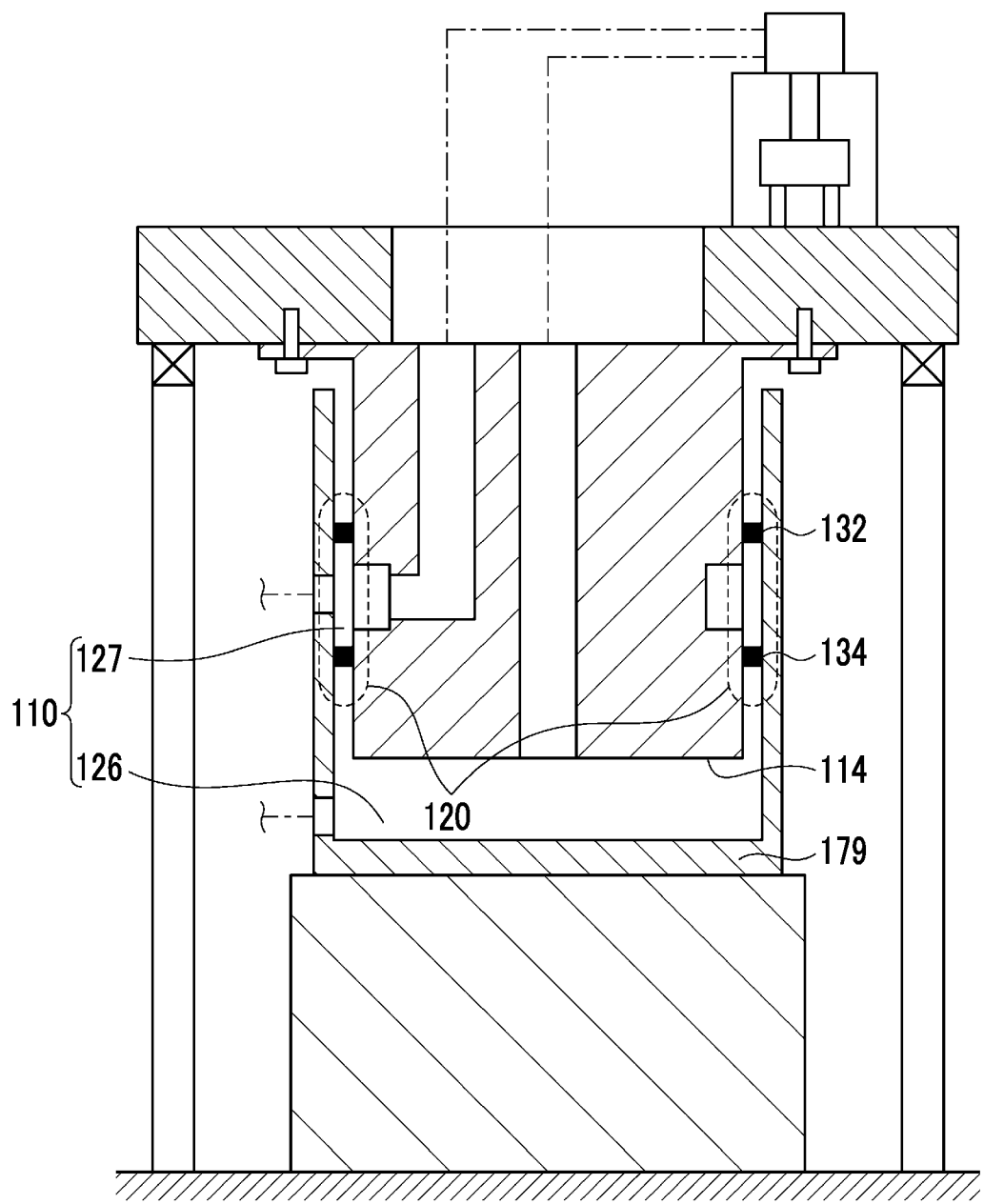
FIG. 9 is a view schematically showing a cryogenic refrigerator according to still another embodiment of the present invention.

FIG. 9 is a view schematically showing a cryogenic refrigerator 10 according to a fifth embodiment of the present invention. Similarly to the cryogenic refrigerator 10 according to the third embodiment, in the cryogenic refrigerator 10 according to the fifth embodiment, the stator bottom wall portion 179 forms a semi-enclosed section, which surrounds the rotor axial end 114. However, unlike the cryogenic refrigerator 10 according to the third embodiment, the cryogenic refrigerator 10 according to the fifth embodiment does not include the seal sleeve. In this way, it is possible to prevent the first high pressure working gas from leaking from the first high pressure section 126 to the surrounding environment.

In addition, similarly to the cryogenic refrigerator 10 according to the fourth embodiment, in the cryogenic refrigerator 10 according to the fifth embodiment, the working-gas sealing area 120 has the first diameter in the first high pressure section 126 and the second diameter in the second high pressure section 127, and the first diameter is smaller than the second diameter. The length in the circumferential direction of the second seal 134 is shorter than the length in the circumferential direction of the first seal 132.

Sixth Embodiment

Figure 10:
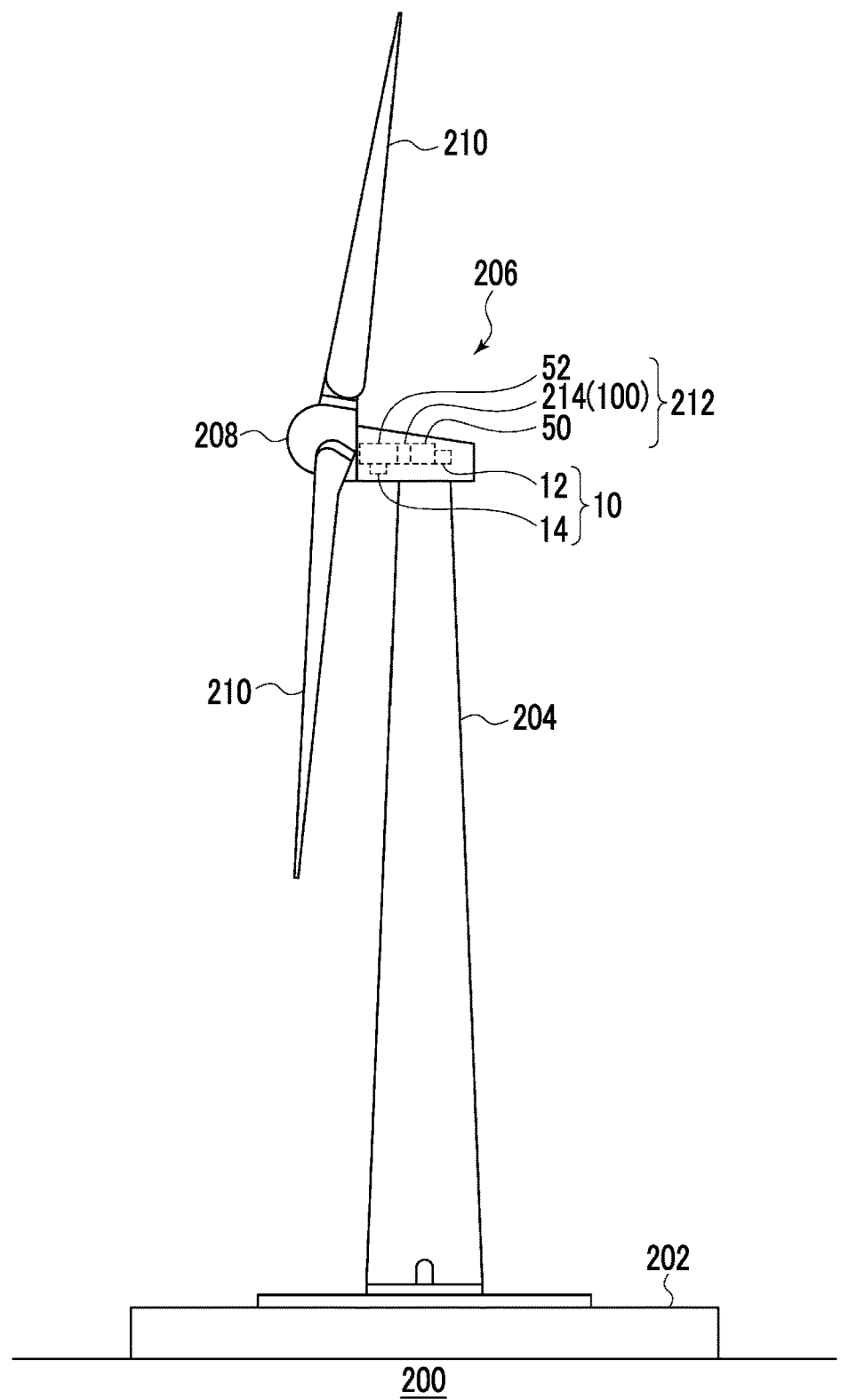
FIG. 10 is a view schematically showing a superconducting wind-power generator according to still another embodiment of the present invention.

FIG. 10 is a view schematically showing a superconducting wind-power generator 200 according to a sixth embodiment of the present invention. The superconducting wind-power generator 200 includes a support column 204, which stands upright on a foundation 202, a nacelle 206 that is installed on the upper end of the support column 204, and a rotary head 208 that is rotatably assembled on the nacelle 206. A plurality of windmill blades 210 are attached to the rotary head 208. In the inner portion of the nacelle 206, a superconducting generator 212 is connected to the rotary head 208.

The superconducting generator 212 includes a stationary portion 50, a rotating portion 52, and a connection mechanism 214 that connects the stationary portion 50 to the rotating portion 52. The rotating portion 52 includes a superconducting coil. The connection mechanism 214 includes the rotary joint 100 according to any one of the first to fifth embodiments. In addition, the cryogenic refrigerator 10 according to any one of the first to fifth embodiments is installed on the superconducting generator 212. As described above, the compressor 12 is installed on the stationary portion 50, and the expander 14 is installed on the rotating portion 52. The superconducting coil of the rotating portion 52 is cooled by the expander 14. In this way, it is possible to provide the cryogenic refrigerator 10, which cools the rotating portion 52 of the superconducting generator 212.

It should be understood that the invention is not limited to the above-described embodiments, and may be modified into various forms on the basis of the spirit of the invention. Additionally, the modifications are included in the scope of the invention.

What is claimed is:

1. A cryogenic refrigerator for installation on an apparatus including a stationary portion and a rotating portion axially rotatably supported by the stationary portion, the refrigerator comprising:
   a compressor installed on the stationary portion;
   an expander installed on the rotating portion; and
   a rotary joint fluidly coupling the compressor with the expander, the rotary joint including
      a rotor fixed to the rotating portion and coaxial with the rotating portion's rotational axis,
      a stator disposed adjacent to the rotor to form a clearance between the rotor and the stator, and fixed to the stationary portion,
      a first high-pressure flowpath, being a flowpath for a first high-pressure working gas having a first high pressure that is higher than ambient pressure of the cryogenic refrigerator, and extending from the stator through the clearance to the rotor,
      a second high-pressure flowpath, being a flowpath for a second high-pressure working gas having a second high pressure that is higher than ambient pressure and is lower than the first high pressure, and extending from the rotor through the clearance to the stator, and
      a working-gas sealing area dividing the clearance into a first high-pressure section communicating with the first high-pressure flowpath, a second high-pressure section adjacent to the first high-pressure section and communicating with the second high-pressure flowpath, and a pressurization section adjacent to the first high-pressure section along an end thereof opposite from its second high-pressure section end, wherein the pressurization section has an intermediate pressure that is higher than ambient pressure and that is lower than the first high pressure.

2. The cryogenic refrigerator according to claim 1, wherein:
   the working-gas sealing area forms a first buffer section adjacent to the second high pressure section along an end thereof opposite its first high-pressure section end, and
   the first buffer section has a first buffering pressure that is higher than ambient pressure and that is lower than the second high pressure.

3. The cryogenic refrigerator according to claim 2, further comprising a buffer volume connected to the first buffer section.

4. The cryogenic refrigerator according to claim 3, wherein the buffer volume is connected to the first buffer section via a pressure control valve.

5. The cryogenic refrigerator according to claim 2, further comprising an auxiliary compressor that recovers gas from the first buffer section.

6. The cryogenic refrigerator according to claim 2, wherein the first buffering pressure is selected from a range of 0.11 MPa to 0.2 MPa.

7. The cryogenic refrigerator according to claim 2, wherein:
the working-gas sealing area forms a second buffer section adjacent to the pressurization section along an end thereof opposite its first high-pressure section end; and
the second buffer section has a second buffering pressure that is higher than ambient pressure and that is lower than the intermediate pressure.

8. The cryogenic refrigerator according to claim 1, wherein the pressurization section communicates with the second high pressure flowpath.

9. The cryogenic refrigerator according to claim 1, wherein the second high pressure and/or the intermediate pressure is selected from a range of 0.11 MPa to 0.2 MPa.

10. A rotary joint for fluidly coupling a cryogenic-refrigerator compressor and expander, the compressor being installed on a stationary component and the expander being installed on a rotator axially rotatably supported by the stationary component, the rotary joint comprising:
a rotor fixed to the rotator and coaxial with the rotator's rotational axis;
a stator disposed adjacent to the rotor to form a clearance between the rotor and the stator, and fixed to the stationary component;
a flowpath for working gas having a pressure higher than ambient pressure of the cryogenic refrigerator, the working gas flowpath extending from the stator through the clearance to the rotor; and
a working-gas sealing area dividing the clearance into a high-pressure section communicating with the working gas flowpath, a first pressurization section adjacent to the high-pressure section, and a second pressurization section adjacent to the high-pressure section along an end thereof opposite its first pressurization section end,
wherein the first pressurization section has a first intermediate pressure that is higher than ambient pressure and is lower than the high pressure section, and the second pressurization section has a second intermediate pressure that is higher than ambient pressure and is lower than the high pressure section.

11. A cryogenic refrigerator for installation on an apparatus including a stationary portion and a rotating portion axially rotatably supported by the stationary portion, the refrigerator comprising:
a compressor installed on the stationary portion;
an expander installed on the rotating portion; and
a rotary joint fluidly coupling the compressor with the expander, the rotary joint including
a rotor fixed to the rotating portion and coaxial with the rotating portion's rotational axis;
a stator disposed adjacent to the rotor to form a clearance between the rotor and the stator, and fixed to the stationary portion;
a first high-pressure flowpath being a flowpath for a first high-pressure working gas having a first high pressure that is higher than ambient pressure of the cryogenic refrigerator, and extending from the stator through the clearance to the rotor;
a second high-pressure flowpath, being a flowpath for a second high-pressure working gas having a second high pressure that is higher than ambient pressure and is lower than the first high pressure, and extending from the rotor through the clearance to the stator; and
a working-gas sealing area dividing the clearance into a first high-pressure section communicating with the first high-pressure flowpath, and a second high-pressure section communicating with the second high-pressure flowpath; wherein
the rotor includes a radially extending annular flat surface surrounding said rotational axis and being perpendicular to said rotational axis,
the working-gas sealing area includes a seal sleeve disposed about the rotational axis to seal the second high pressure section from ambient pressure, and
the seal sleeve has a sealing surface contacting the annular flat surface.

12. The cryogenic refrigerator according to claim 11, wherein the working-gas sealing area includes a biasing member linking the seal sleeve to the stator and biasing the seal sleeve against the annular flat surface.

13. The cryogenic refrigerator according to claim 11, wherein the seal sleeve includes a pressure-receiving surface for receiving the second high pressure, the seal sleeve being pressed to the annular flat surface via the second high pressure.

14. The cryogenic refrigerator according to claim 11, wherein:
the working-gas sealing area includes a first auxiliary seal disposed between the seal sleeve and the rotor, and extending about the rotational axis;
the clearance includes a buffer section formed between the first auxiliary seal and the seal sleeve's sealing surface; and
the buffer section has a buffering pressure that is higher than ambient pressure and is lower than the second high pressure.

* * * * *